A. A. HARRIS.
RUBBER HEEL.
APPLICATION FILED MAR. 16, 1916. RENEWED JUNE 19, 1920.

1,366,797.  Patented Jan. 25, 1921.

INVENTOR
Allan A. Harris
By his attorneys ic
UNITED STATES PATENT OFFICE.

ALLAN A. HARRIS, OF RANDOLPH, MASSACHUSETTS, ASSIGNOR TO FRANK BERENSTEIN, OF CHELSEA, MASSACHUSETTS.

RUBBER HEEL.

1,366,797.  Specification of Letters Patent.  Patented Jan. 25, 1921.

Application filed March 16, 1916, Serial No. 84,617. Renewed June 19, 1920. Serial No. 390,271.

*To all whom it may concern:*

Be it known that I, ALLAN A. HARRIS, a citizen of the United States, residing at Randolph, in the county of Norfolk and State of Massachusetts, have invented certain Improvements in Rubber Heels, of which the following description, in connection with the accompanying drawings, is a specification, like reference characters on the drawings indicating like parts in the several figures.

This invention relates to rubber articles having surfaces that are subjected to severe wear such for instance, as rubber heels and soles, tires, crutch tips and the like; and it is particularly concerned with articles of this kind which are provided with friction plugs or inserts designed to prevent slipping or to increase the wear resisting qualities of the article. These plugs or inserts usually are secured in the heel, sole or other parts of the article merely by the adhesiveness of the rubber, the parts of the plug usually being impregnated with a rubber cement or compound designed to promote this adhesion. It is found, however, that the bond or union thus formed between the plug and the rubber body of the article is often destroyed after the article has been in service for only a relatively short time or when it is subjected to especially hard usage and the plugs consequently are allowed to drop out of the article. Among the causes for this result is the fact that these plugs are relatively firm and inelastic as compared with the rubber body in which they are embedded, and this difference in elasticity permits a relative movement between the outer wall of the plug and the adjacent rubber parts as the rubber is compressed and allowed to expand again while the article is in use; and this relative movement of course tends to tear the rubber away from the plug.

The present invention is directed to the solution of the problem presented by these conditions and aims to devise a thoroughly practical means for anchoring plugs or inserts of this character in a rubber article. A convenient embodiment of the invention will now be described, reference being made to the accompanying drawings in which, Figure 1 is a plan view of the tread face of a rubber heel having several friction plugs embedded in it;

Figure 1:
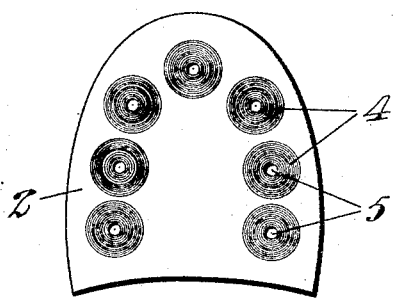
Figure 2:
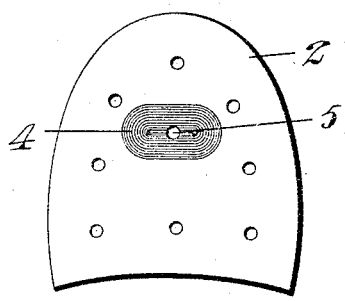
Fig. 2 is a similar view of a heel of a slightly different construction.

In the drawings a rubber heel is indicated at 2 and the plug or plugs with which it is equipped are designated by the numeral 4. While the plug 4 may be constructed in any suitable manner and any desired number of them may be used, the particular plug shown is of a very common form and is made by rolling a strip of canvas or textile fabric up into a circular, elliptical or other cross sectional form, and then cutting from the rope like strip made in this manner, plugs of the desired length. Usually the material from which the plugs are made is impregnated with a rubber compound to cause the adjacent layers of the plug to adhere securely to each other and more particularly for the purpose of causing the outer wall of the plug to unite with the adjacent rubber parts of the heel. As above stated, however, the plugs secured in this manner are liable to work loose and drop out, particularly if the heel or other article in which the plugs are embedded is subjected to service which tends to pull or throw the plug out of the article. According to the present invention, therefore, a plug retaining device is used which anchors the plug securely in the heel, although the adhesiveness of the rubber preferably also is utilized as in the present constructions.

Figure 3:
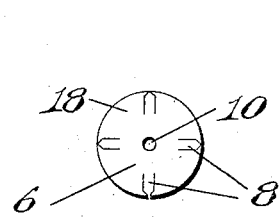
Fig. 3 is a plan view of the blank for the retaining device.
Figure 4:
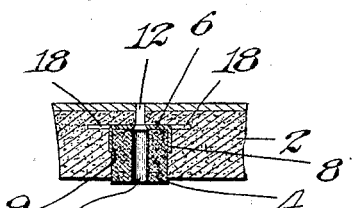
Fig. 4 is a central vertical section of the invention as applied.

This retaining device is clearly shown in Figs. 3 to 4 and comprises a body 6 provided with several arms of fingers 8. Fig. 3 shows a blank for one of these retaining devices cut out of sheet metal of any suitable character, such, for instance, as sheet brass. The fingers 8 terminate in points or prongs 9 which preferably are turned in at substantially right angles to the fingers themselves and these fingers are turned up at right angles to the body 6 of the retaining device, substantially as shown in Fig. 4.

The plug 4 may be secured in the retainer 6 by any convenient method. For instance, the fingers 8 may first be turned up nearly at right angles to the body 6; the plug 4 may then be set into it and the points 9 driven into and embedded firmly in the plug as shown in Fig. 4. If this method is followed the preliminary shaping operations of the retainer blank necessary to prepare it to receive the plug may all be performed by means of suitable punches and dies as will be readily understood by those skilled in the art of punching or dieing out sheet metal. If desired, however, the blank may be cut out as shown in Fig. 3 and the points 9 turned up, and one of these blanks may then be placed on a suitable die while a plunger carrying a plug 4 brings this plug down on the blank and forces it into or through an aperture in the die shaped to turn the fingers 8 up around the body of the plug and embed the points 9 in it as shown in Fig. 4. The fingers 8 thus securely grip the end of the plug.

It will be noted that the plugs 4, instead of being made solid as usual at the present time, are each provided with a central hole 5 which may be formed by building up the plug on a mandrel which later is removed leaving the hole 5. In assembling the retaining device and the plug in the manner just described the plunger or gang of plungers, if an assembling machine of the gang type is used, may each be provided with a pin designed to enter the hole 5 and hold the plug temporarily on the plunger. The real purpose, however, of this hole is to permit the driving of a fastening 12 through the plug and through the plug retainer 6 into the heel of the shoe. For this purpose the retainer is provided with an aperture 10 that alines with the hole 5 in the plug 4. The plug may, of course, be of any suitable length, but usually should be so proportioned that it will not extend entirely through the heel. The fastenings 12 therefore serve both to secure their respective plugs 4 to the shoe heel and also to secure the rubber heel 2 to the heel of the shoe. In other words, the members 6 serve the same purposes, so far as the heel 2 is concerned, as do the washers ordinarily used in a rubber heel to receive the fastenings by which the heel is secured to a shoe. If a large number of these plugs are used in a heel, as in the construction shown in Fig. 1, the fastenings 12 required for them may be sufficient to hold the rubber heel on to the shoe heel and thus eliminate the necessity for other fastenings.

Preferably the prongs or points 9 which are embedded in the plug are positioned relatively close to the inner end of the plug so that they will not be exposed to wear on the tread face of the heel until the heel has become worn to such an extent that it is practically useless.

In manufacturing the heel, the plug or plugs used in it may be supported in the heel mold by washer pins entering the holes 10 in exactly the same way that the washers now used in rubber heels are supported in the molds by said pins.

The blank 6 is larger in diameter than the plug 4, the fingers 8 being struck out of the metal of the blank, thereby leaving or providing a marginal flange 13 projecting away from the plug and embedded in the rubber body of the heel 2. The retaining device is thus anchored so securely in the heel that other fastening or anchoring means may be dispensed with if desired.

Having thus described my invention, what I claim as new and desire to secure by Letters Patent of the United States is:

In a rubber heel, a body having a recess in its tread face, a friction plug located in said recess, and means for anchoring the plug in the recess, comprising a metallic plate overlying and of greater diameter than that of the plug and having downwardly projecting fingers integral therewith and engaging the plug and a marginal outwardly projecting flange also integral therewith and embedded in the material of said body.

In testimony whereof I have signed my name to this specification.

ALLAN A. HARRIS.